March 18, 1924. Re. 15,795

H. N. JONES

CIGARETTE EXTINGUISHING DEVICE

Original Filed May 15, 1920

Inventor

Howard N. Jones

By Howard E. Barlow

Attorney

Reissued Mar. 18, 1924.

Re. 15,795

UNITED STATES PATENT OFFICE.

HOWARD N. JONES, OF PROVIDENCE, RHODE ISLAND, ASSIGNOR, BY DIRECT AND MESNE ASSIGNMENTS, TO UNIVERSAL SAFETY ASH TRAY COMPANY, INC., OF PROVIDENCE, RHODE ISLAND, A CORPORATION OF RHODE ISLAND.

CIGARETTE-EXTINGUISHING DEVICE.

Original No. 1,372,143, dated March 22, 1921, Serial No. 381,765, filed May 15, 1920. Application for reissue filed March 22, 1922. Serial No. 545,854.

*To all whom it may concern:*

Be it known that I, HOWARD N. JONES, a citizen of the United States, residing in the city of Providence, county of Providence, and State of Rhode Island, have invented certain new and useful Improvements in Cigarette-Extinguishing Devices, of which the following is a specification, reference being had therein to the accompanying drawing.

This invention relates to a cigarette-extinguishing device, and has for its object to provide a simple and inexpensive device of this character, which may serve as a table ornament and also as a means for readily extinguishing a lighted cigarette by simply depositing its lighted end thereinto.

A further object of the invention is to provide means whereby the cigarette may be readily ejected from the holder after the fire has been extinguished therefrom.

The nature and advantages of the invention will be better understood when the following detailed description is taken in connection with the accompanying drawings, the invention residing in the combination and arrangement of parts as claimed.

In the drawings forming part of this specification, like numerals of reference indicate similar parts in the several views and wherein:—

Figure 1:
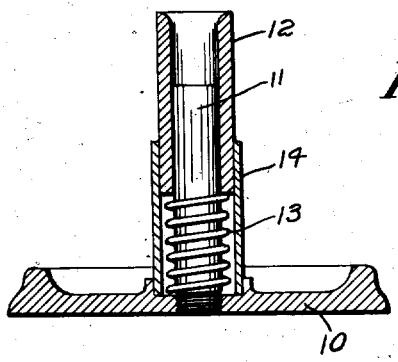
Figure 1 is an elevation partly in section illustrating my improved combined ash-tray and cigarette-extinguishing device.
Figure 2:
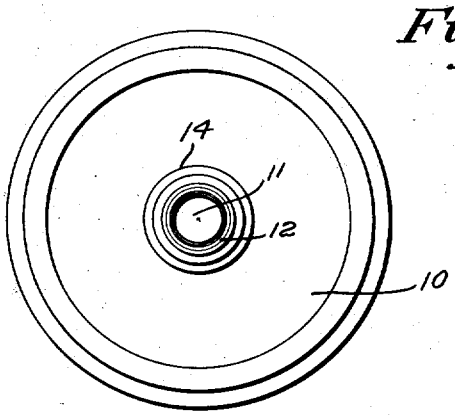
Figure 2 is a top view of the device.
Figure 3:
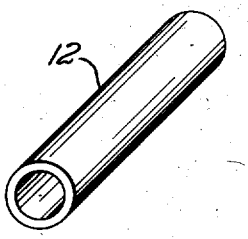
Figure 3 is a perspective view of the slidable tubular member detached, into which the lighted end of a cigarette may be placed.

As is well known by cigarette smokers a lighted cigarette upon being laid down in a tray or elsewhere, continues to burn until the whole is consumed, which often is very objectionable, particularly to the non-smokers in the room.

It is well known that considerable manipulation is usually required in order to extinguish the lighted end of a cigarette. Therefore it is found desirable to provide means whereby a cigarette may be readily extinguished without effort on the part of the smoker, which result has been accomplished by my simple device, which at once extinguishes the fire upon placing the lighted end of the cigarette thereinto.

The following is a detailed description of one means by which this extinguishing effect may be readily accomplished:—

With reference to the drawings, 10 designates an ordinary ash-tray which may be made in any suitable, ornamental form and which also serves as a base for my cigarette-extinguishing device.

This device comprises essentially a central post 11 which is screwed into or otherwise fixed in the base 10, and on this post I have slidably mounted a tubular member 12 which is normally supported by means of the spring 13 so that its upper end will stand a substantial distance above that of the post, thereby providing a receptacle or socket into which the lighted end of a cigarette may be placed.

It is found in practice that by simply inserting the lighted end of a cigarette into this receptacle the fire on this end becomes at once choked or smothered and so extinguished.

In burning a cigarette in the open air the ash is soft and easily displaced from its end, but when the lighted end is positioned in my extinguishing tube this ash cokes or becomes hardened and does not drop off or become deposited in the tube. It is also found that this coking over of the ashes on the burnt end of a cigarette serves to assist in seasoning or flavoring the tobacco in the cigarette which when lighted a second time is much more palatable than when initially burnt.

It is also found by connoisseur smokers that the first time a cigarette is lighted it is not so palatable as when permitted to go out and is lighted a second time. Therefore it is of advantage to provide a device which will instantly smother and extinguish the cigarette when desired without waste, and by the use of my device it is only necessary to insert the lighted end into the tube, which causes it to be immediately extinguished after which the cigarette may be removed and when relighted the user experiences the finer flavor thus produced.

When a short butt has been inserted into the tube to be extinguished it is only necessary to slide the tubular member downwardly on the post 11, which action causes the post to eject the cigarette thus preparing the tube for the reception of another, and in this way cigarettes may be extinguished and deposited in the tray one after another as soon as finished by the user.

In some instances it is found desirable to provide a casing or housing for the spring 13, which is accomplished by attaching a short tubular member 14 to the base, which extends up over and encloses the spring as illustrated.

The device is extremely simple and inexpensive in construction and effective in its operation inasmuch as the lighted end of a cigarette may be readily positioned therein, which operation quickly chokes, smothers and extinguishes the same without further attention on the part of the user; after which it is only necessary to slide the tubular member 12 downwardly on its post to at once eject the extinguished cigarette permitting it to fall into the tray beneath after which the tube automatically returns under action of the spring 13 into the position to receive another and repeat the operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination with an ash receiver, a cigarette extinguishing device comprising a tubular member having a bottom closure and adapted to receive a cigarette, said member being of a diameter to approximately fit and be closed by the insertion of the cigarette to smother and so extinguish the lighted end thereof, and means for supporting said member to permit a movement relative to the receiver to discharge its contents into said receiver.

2. An ash receiver comprising a recessed body, a tubular member supported by said receiver and having a closure member for one end thereof, said tubular member being of a diameter to approximately fit and being adapted to receive, smother and so extinguish the lighted end of a cigarette, said tubular member and said closure member being movable one relatively to the other to discharge the contents of the tubular member into the receiver when desired.

3. A smoker's ash tray having an ash receiving chamber, a cigarette extinguishing member cooperating with said chamber comprising a socket member for receiving and smothering a cigarette located above said chamber and in normally non-communicating relation to said chamber, and supporting means for said socket member permitting the socket to be operated to deposit its contents into said chamber.

4. In combination with an ash receiver, a tubular member supported on said receiver, a bottom closure member for said tubular member supported on said receiver, said tubular member being adapted to receive and being of a diameter to approximately fit and smother and so extinguish the lighted end of a cigarette when inserted thereinto, said members being movable one relatively to the other for discharging the contents of the tubular member into said receiver.

5. A cigarette-extinguishing device comprising a base having a fixed upstanding post, a tubular member slidably mounted on said post, said tube being supported with its upper end normally standing a substantial distance above the upper end of said post forming a receptacle into which the lighted end of a cigarette may be positioned and extinguished said tube being slidable downward on said post to eject the cigarette therefrom.

6. A cigarette-extinguishing device comprising a base having a fixed upstanding post, a tubular member slidably mounted on said post, a spring acting on said tube to support it with its upper end normally a substantial distance above that of said post providing a receptacle into which the lighted end of a cigarette may be positioned and extinguished, said tube being adapted to be slid downwardly on said post to eject the cigarette therefrom and to be automatically returned to normal by said spring, and a housing for said spring.

Providence, Rhode Island, March 18, 1922.

In testimony whereof, I affix my signature in presence of two witnesses.

HOWARD N. JONES.

Witnesses:
E. P. Reilly,
A. F. Macready.